United States Patent [19]
Mallozzi et al.

[11] 4,060,769
[45] Nov. 29, 1977

[54] DIRECTING RADIATION

[75] Inventors: Philip J. Mallozzi; Harold M. Epstein; David C. Applebaum, all of Columbus; William J. Gallagher, Worthington; Bernerd E. Campbell, Columbus, all of Ohio

[73] Assignee: Battelle Memorial Institute, Columbus, Ohio

[21] Appl. No.: 507,877

[22] Filed: Sept. 20, 1974

[51] Int. Cl.² .................... H01S 3/00; G02B 27/14
[52] U.S. Cl. .................................. 330/4.3; 350/147; 350/171
[58] Field of Search ............ 219/121 L, 121 LM, 349; 350/147, 152, 169, 171–174; 331/94.5 C; 330/4.3

[56] References Cited

U.S. PATENT DOCUMENTS

| 3,430,048 | 2/1969 | Rubinstein | 350/169 X |
| 3,447,856 | 6/1969 | De Lange | 350/147 X |
| 3,622,740 | 11/1971 | Ravussin et al. | 219/121 L |
| 3,637,287 | 1/1972 | Hansen | 350/147 |
| 3,638,024 | 1/1972 | Chen et al. | 350/147 X |
| 3,684,346 | 8/1972 | Lang | 350/96 B |
| 3,778,585 | 12/1973 | Mallozzi et al. | 219/121 LM |
| 3,817,604 | 6/1974 | Watt | 350/232 |
| 3,879,109 | 4/1975 | Thomas | 350/169 X |

FOREIGN PATENT DOCUMENTS

| 291,532 | 2/1971 | U.S.S.R. | 330/4.3 |

OTHER PUBLICATIONS

Burgess, T. J., "Lasers for Fusion Systems," IEEE Trans. on Plasma Science, vol. PS-2, 6-1973, pp. 26–29.

Primary Examiner—John K. Corbin
Assistant Examiner—Wm. H. Punter
Attorney, Agent, or Firm—Philip M. Dunson

[57] ABSTRACT

Methods and apparatus for directing radiation pulses to a region wherein either a pulse or a substance in the region is adversely affected by the presence of more than a given power density therein. A laser pulse is split into a plurality of portions and each portion is directed along a path of different length to provide in rapid succession a plurality of pulses each having less than the given power density. Each pulse is caused to arrive at the region at an angle differing by at least its divergence angle from the arrival angle of every other pulse (or, if at a smaller angle from another pulse, with opposite polarization therefrom) and at a time enough later than the arrival time of the preceding pulse that the total power density in the region at any instant is less than the given power density. Thus, the effective total power density of the radiation directed through the region may exceed the given power density without adversely affecting any pulse or substance in the region. Typically, the region comprises an amplifier from which each pulse emerges at an angle differing by at least its divergence angle from the emergence angle of every other pulse (or, if at a smaller angle from another pulse, with opposite polarization therefrom). Each emerging pulse is separated from the others and is directed along a path of such length as to cause it to arrive at the selected location substantially simultaneously with the other pulses (or, alternatively, at such time relative to the other pulses as to provide a predetermined effective combined pulse shape at the location).

17 Claims, 3 Drawing Figures

DIRECTING RADIATION

BACKGROUND

Recent activity in various fields of research such as in controlled thermonuclear fusion, generating plasmas to produce X-rays, and shock treatment of materials requires increasingly more powerful lasers to provide the extremely high power densities that are required for optimum results.

Such uses of high powered lasers are disclosed and claimed in the following United States patent applications and patents of Philip J. Mallozzi et al., Ser. No. 265,799 filed June 23, 1972, for Altering Material Properties, now U.S. Pat. No. 3,850,698, issued Nov. 26, 1974; Ser. No. 319,756, filed Dec. 29, 1972, for Producing X-Rays, and Ser. No. 353,691 filed Apr. 23, 1973, (now replaced by a continuation thereof, Ser. No. 650,803, filed Jan. 20, 1976) for Applying Radiation.

High powered lasers typically comprise several stages of amplification with serveral amplifiers operating in parallel in the final stage. However, the power that can be passed through many optical devices such as amplifiers made of glass is limited because excessive power density damages the material. In some arrangements, even where apparatus may not be damaged, the shape or other characteristics of a radiation pulse may be adversely affected by the presence of more than a given power density in a region.

The effects of such limitations are substantially reduced by the present invention, which enables an amplifier to pass an effective total power density that may be approximately doubles, triple, or even a higher multiple of the highest power density it is capable of passing when used in conventional ways. Thus by means of the present invention the size, complexity, and cost of providing a very powerful laser facility have been kept well below what otherwise would have been required to provide the same power.

SUMMARY OF THE INVENTION

A typical method according to the present invention for directing radiation pulses to a region wherein either a pulse or a substance in the region is adversely affected by the presence of more than a given power density therein comprises providing in rapid succession a plurality of pulses each having a power density of not more than the given power density, causing each pulse to arrive at the region either at an angle differing by at least its divergence angle from the arrival angle of every other pulse, or, if at a smaller angle from another pulse, with opposite polarization therefrom, and causing each pulse to arrive at the region at a time enough later than the arrival time of the preceding pulse that the total power density in the region at any instant is not more than the given power density, so that the effective total power density of the radiation directed through the region may exceed the given power density without adversely affecting any pulse or substance in the region.

Typically a radiation pulse is split into a plurality of portions and each portion is directed along a path of different length to provide the succession of pulses to the region.

Each pulse directed to the region typically emerges therefrom either at an angle differing by at least its divergence angle from the emergence angle of every other pulse, or, if at a smaller angle from another pulse, with opposite polarization therefrom, and each emerging pulse is directed along a different path to a selected location. A pulse emerging from the region at an angle that is less than its divergence angle from another emerging pulse is separated therefrom by polarization sensitive means. The path length of each emerging pulse typically is chosen so as to cause it to arrive at the selected location substantially simultaneously with the other pulses. Alternatively, the path length may be chosen so as to cause each pulse to arrive at the selected location at such time relative to the other pulses as to provide a predetermined effective combined pulse shape at the location.

Typical apparatus according to the invention for directing radiation pulses to a region wherein either a pulse or a substance in the region is adversely affected by the presence of more than a given power density therein includes the improvement comprising means for providing in rapid succession a plurality of pulses each having a power density of not more than the given power density, means for causing each pulse to arrive at the region either at an angle differing by at least its divergence angle from the arrival angle of every other pulse, or, if at a smaller angle from another pulse, with opposite polarization therefrom, and means for causing each pulse to arrive at the region at a time enough later than the arrival time of the preceding pulse that the total power density in the region at any instant is not more than the given power density, so that the effective total power density of the radiation directed through the region may exceed the given power density without adversely affecting any pulse or substance in the region.

Typically the pulse providing means comprises means for splitting a radiation pulse into a plurality of portions and means for directing each portion along a path of different length to the region.

The apparatus typically includes means for causing each pulse directed to the region to emerge therefrom either at an angle differing by at least its divergence angle from the emergence angle of every other pulse, or, if at a smaller angle from another pulse, with opposite polarization therefrom, and means for directing each emerging pulse along a different path to a selected location; as well as polarization sensitive means for separating from each other any pair of pulses emerging from the region at an angle from each other that is less than the divergence angle of either pulse. The path directing means typically are arranged to direct each pulse along a path of such length as to cause the pulse to arrive at the selected location substantially simultaneously with the other pulses. Alternatively, the path directing means may be arranged to direct each pulse along a path of such length as to cause it to arrive at the selected location at such time relative to the other pulses as to provide a predetermined effective combined pulse shape at the location. The region typically comprises means for amplifying the pulses directed thereto.

The apparatus typically comprises also at least one additional such apparatus, region, and associated improvement means. Typically the pulse providing means comprises means for splitting a radiation pulse into a plurality of portions and means for directing a smaller plurality of portions each along a path of different length, to each region. Typically included in the apparatus are means for causing each pulse directed to each region to emerge therefrom either at an angle differing by at least its divergence angle from the emergence angle of every other pulse in the same region, or, if at a smaller angle from another pulse, with opposite polarization therefrom, and means for directing each emerging pulse along a different path to a selected location; together with polarization sensitive means for separting from each other any pair of pulses emerging from the same region at an angle from each other that is less than the divergence angle of eiter pulse. The path directing means typically are arranged to direct each pulse along a path of such length as to cause the pulse to arrive at the selected location substantially simultaneously with the other pulses. Alternatively, the path directing means may be arranged to direct each pulse along a path of such length as to cause it to arrive at the selected location at such time relative to the other pulses as to provide a predetermined effective combined pulse shape at the location. Each region typically comprises means for amplifying the pulses directed thereto.

DESCRIPTION OF PREFERRED EMBODIMENTS

Figure 1:
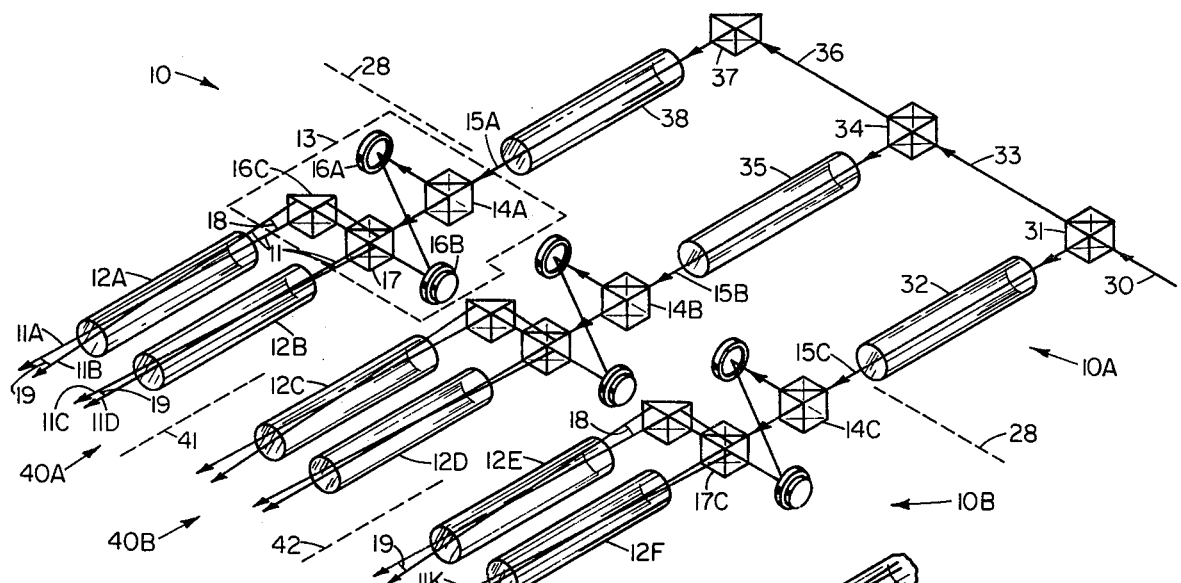
FIG. 1 is a schematic perspective view illustrating typical embodiments of the present invention.

FIG. 1 schematically illustrates typical apparatus 10 according to the present invention for directing radiation pulses 11 to a region 12 (i.e. either 12A, 12B, 12C, 12D, 12E, or 12F in FIG. 1, or 12 in FIG. 3) wherein either a pulse 11 or a substance in the region 12 is adversely affected by the presence of more than a given power density therein. An important feature of the apparatus 10 is the improvement comprising means 13; 23 for providing in rapid succession a plurality of pulses 11 each having a power density of not more than the given power density, means 14, 16; 23 for causing each pulse 11 to arrive at the region 12 either at an angle 18 differing by at least its divergence angle from the arrival angle of every other pulse 11 as in FIG. 1, or, if at a smaller angle 18 from another pulse 11, with opposite polarization therefrom as 11M, 11N in FIG. 3, and means 16 for causing each pulse 11 to arrive at the region 12 at a time enough later than the arrival time of the preceding pulse 11 that the total power density in the region 12 at any instant is not more than the given power density, so that the effective total power density of the radiation 11 directed through the region 12 may exceed the given power density without adversely affecting any pulse 11 or substance in the region 12. Thus considerably more power may pass through the region 12 than is feasible with conventional apparatus.

Typically the pulse providing means 13; 23 comprises means 14; 25 for splitting a radiation pulse 15 into a plurality of portions 11 and means 16, 17; 26, 27 for directing each portion 11 along a path of different length to the region 12.

Figure 2:
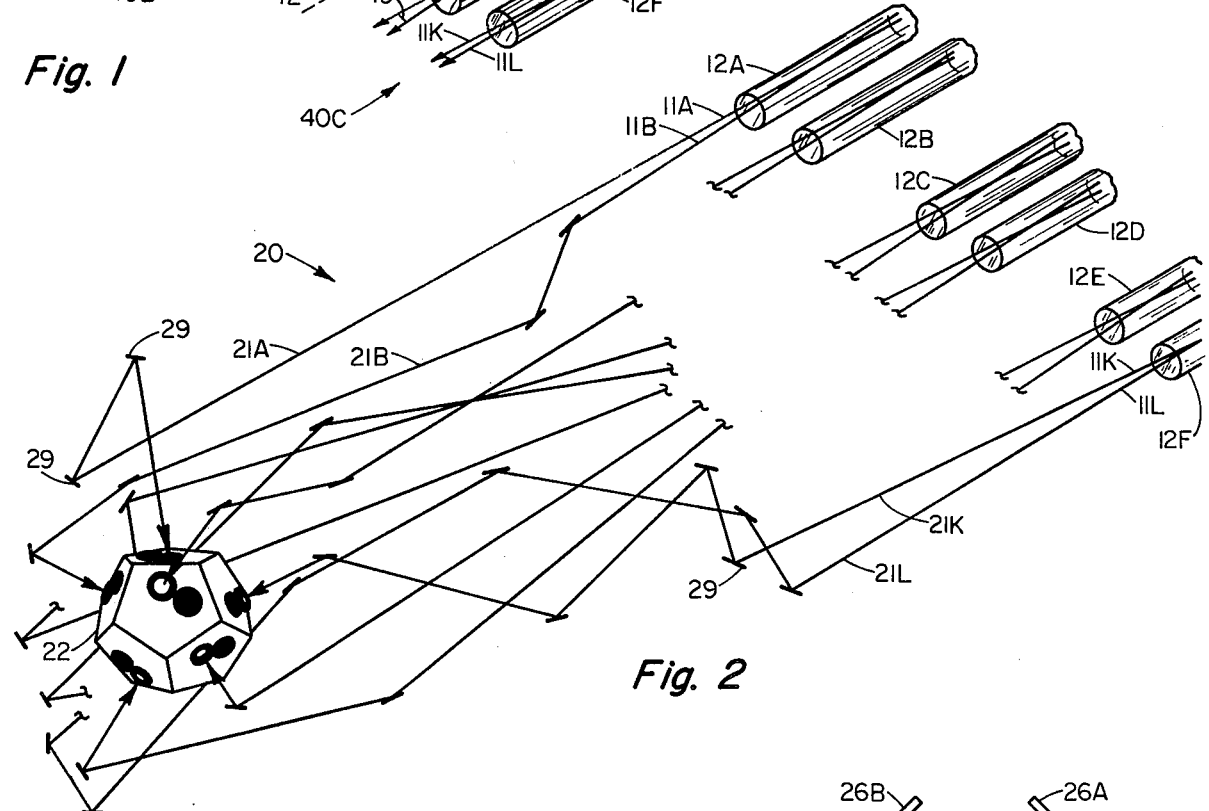
FIG. 2 is a similar view showing additional features included in some typical embodiments of the invention.
Figure 3:
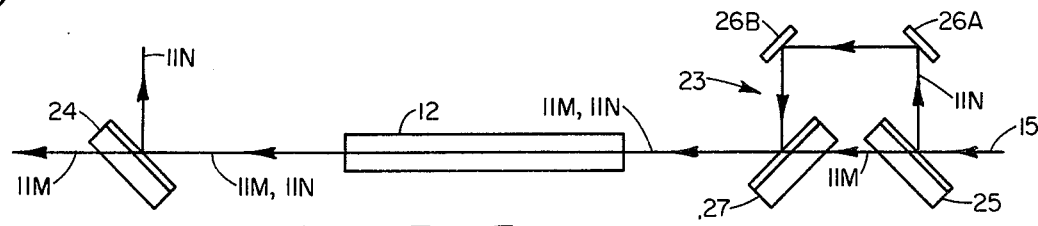
FIG. 3 is a schematic plan view of an alternative form of a portion of the apparatus in FIG. 1.

The apparatus 10 typically includes means at 12 for causing each pulse 11 directed to the region 12 to emerge therefrom either at an angle 19 differing by at least its divergence angle from the emergence angle of every other pulse 11, or, if at a smaller angle 19 from another pulse 11, with opposite polarization therefrom as 11M, 11N in FIG. 3, and means 20 (FIG. 2) for directing each emerging pulse 11A, 11B, . . . 11K, 11L along a different path 21A–21L to a selected location 22; as well as polarization sensitive means 24 for separating from each other any pair of pulses 11M, 11N emerging from the region 12 at an angle from each other that is less than the divergence angle of either pulse 11.

The path directing means 20 typically are arranged to direct each pulse 11A, etc., along a path 21A, etc., of such length as to cause the pulse 11A, etc., to arrive at the selected location 22 substantially simultaneously with the other pulses 11A, etc. Alternatively, the path directing means 20 may be arranged to direct each pulse 11A, etc., along a path 21A, etc., of such length as to cause the pulse 11A, etc., to arrive at the selected location 22 at such time relative to the other pulses 11A, etc., as to provide a predetermined effective combined pulse shape at the location 22. The region 12 typically comprises means 12 for amplifying the pulses 11 directed thereto.

The apparatus typically comprises also at least one additional such apparatus 10, region 12, and associated improvement means 13–24. Typically the pulse providing means 13; 23 comprises means for splitting a radiation pulse 15 into a plurality of portions 11, and means 16, 17; 26, 27 for directing a smaller plurality of portions 11, each along a path of different length, to each region 12. Typically included in the apparatus 10 are means at 12 for causing each pulse 11 directed to each region 12 to emerge therefrom either at an angle 19 differing by at least its divergence angle from the emergence angle of every other pulse 11 in the same region 12, or, if at a smaller angle 19 from another pulse 11, with opposite polarization therefrom as 11M, 11N in FIG. 3, and means 20 (FIG. 2) for directing each emerging pulse 11A, etc., along a different path 21A, etc., to a selected location 22; together with polarization sensitive means 24 for separating from each other any pair of pulses 11M, 11N emerging from the same region 12 at an angle from each other that is less than the divergence angle of either pulse 11.

The path directing means 20 typically are arranged to direct each pulse 11A, etc., along a path 21A, etc., of such length as to cause the pulse 11A, etc., to arrive at the selected location 22 substantially simultaneously with the other pulses 11A, etc. Alternatively, the path directing means 20 may be arranged to direct each pulse 11A, etc., along a path 21A, etc., of such length as to cause the pulse 11A, etc., to arrive at the selected location 22 at such time relative to the other pulses 11A, etc., as to provide a predetermined effective combined pulse shape at the location 22. Each region 12 typically comprises means 12 for amplifying the pulses 11 directed thereto.

A typical method of using apparatus 10, 20 as in FIGS. 1–3 for directing radiation pulses 11 to a region 12 wherein either a pulse 11 or a substance in the region 12 is adversely affected by the presence of more than a given power density therein comprises providing in rapid succession a plurality of pulses 11 each having a power density of not more than the given power density, causing each pulse 11 to arrive at the region 12 either at an angle 18 differing by at least its divergence angle from the arrival angle of every other pulse 11 as in FIG.

1, or, if at a smaller angle 18 from another pulse 11, with opposite polarization therefrom as in FIG. 3, and causing each pulse 11 to arrive at the region 12 at a time enough later than the arrival time of the preceding pulse 11 that the total powder density in the region 12 at any instant is not more than the given power density, so that the effective total power density of the radiation 11 directed through the region 12 may exceed the given power density without adversely affecting any pulse 11 or substance in the region 12.

Typically a radiation pulse 15 is split into a plurality of portions 11 and each portion 11 is directed along a path of different length to provide the succession of pulses 11 to the region 12.

Each pulse 11 directed to the region 12 typically emerges therefrom either at an angle 19 differing by at least its divergence angle from the emergence angle of every other pulse 11, or, if at a smaller angle 19 from another pulse 11, with opposite polarization therefrom as 11M, 11N in FIG. 3, and each emerging pulse 11A, etc., is directed along a different path 21A, etc., (FIG. 2) to a selected location 22. A pulse 11M emerging from the region 12 at an angle that is less than its divergence angle from another emerging pulse 11N is separated therefrom by polarization sensitive means 24.

The path length along 21A, etc., of each emerging pulse 11 typically is chosen so as to cause it to arrive at the selected location 22 substantially simultaneously with the other pulses 11. Alternatively, the path length along 21A, etc., of each emerging pulse 11 may be chosen so as to cause it to arrive at the selected location 22 at such time relative to the other pulses 11 as to provide a predetermined effective combined pulse shape at the location 22.

Since the last quarter of 1973 amplifying apparatus 10 as in FIG. 1 has been used as the output amplifier in the most powerful laser installation in the world at that time (1973). The semi-final amplifier stage 10A, comprising the apparatus above and to the right of the dashed line 28, receives the output 30 from a Hadron/CGE VD-640 laser system of seven stages, typically comprising a pulse about 1 to 5 nanoseconds in duration and having an energy of about 100 to 150 joules. The pulse 20 is split into two parts by a beam splitter 31, approximately ⅓ of the energy being reflected into an amplifier rod 32 made of neodymium doped glass and providing an amplified output pulse 15C which serves as an input to the final amplifier stage 10B comprising the apparatus below and to the left of the dashed line 28. About 2/3 of the energy of the pulse 30 is transmitted through the beam splitter 31 and proceeds as indicated at 33 to a beam splitter 34 which splits the energy approximately equally, reflecting ½ to an amplifier rod 35, which provides an amplified input pulse 15B to the final amplifier stage 10B. The other half of the energy of the pulse 33 passes through the beam splitter 34 and proceeds as indicated at 36 to a mirror 37 which reflects it into the amplifier 38 which provides an amplified input pulse 15A to the final amplifier stage 10B.

The final amplifier stage 10B comprises three identical portions 40A, 40B, 40C as divided by the dashed lines 41 and 42; each amplifier portion 40 comprising a double pulsing bifurcator 13 and a pair of amplifier rods 12 about 64 millimeters in diameter and about 68 centimeters long, made of neodymium doped glass. In the amplifying section 40A, the bifurcator 13 comprises a beam splitter 14A, 3 mirrors 16 and a beam splitter 17. In an ideal situation, the input pulse 15A is directed to the beam spliter 14A, which transmits approximately half of the energy onto the other beam splitter 17 and reflects approximately half to the mirror 16A from which it is reflected to the mirror 16B and from there further reflected to the beam splitter 17. Approximately half of the energy in each pulse arriving at the beam splitter 17 proceeds from there to the amplifier 12B, the other half going to the mirror 16C and from there to the amplifier 12A.

Thus approximately ¼ of the energy in the pulse 15A proceeds directly through the beam splitters 14A and 17 to the amplifier 12B from which it emerges as the amplified pulse 11D. Another ¼ of the energy of the pulse 15A is reflected from the beam splitter 14A, the mirrors 16A and 16B, and the beam splitter 17 to the amplifier 12B from which it emerges as the amplified pulse 11C at an angle 19 from the pulse 11B approximately equal to the angle 18 between the two pulses as they enter the amplifier 12B, the angles 18 and 19 being at least equal to the divergence angle of each pulse 11C, 11D. The divergence angles typically are of the order of one milliradian, and the separation angles 18 and 19 typically are about 10 to 20 milliradians.

Since the pulse 11C travels over a longer path than does the pulse 11D between the beam splitters 14A and 17, the pulse 11C arrives at the amplifier 12B after the pulse 11D has emerged therefrom, so the power density in the amplifier 12B at any given time never exceeds the power density of the individual pulse 11D or 11C, which is not more than the given power density that the amplifier 12B can pass without being adversely affected. However, the effective total power density of the radiation directed through the amplifier 12B by the rapid succession of the pulses 11D, 11C may exceed the given power density without adversely affecting any pulse 11 or substance in the amplifier 12B.

In a similar manner the pulse 11A, comprising approximately ¼ of the energy of the input pulse 15A proceeds over the shorter path 14A, 17, 16C, 12A, emerging from the amplifier 12A before the pulse 11B enters it over the path 14A, 16A, 16B, 17, 16C, 12A. The delay time, angles, and power densities are approximately the same as those for the pulses 11C, 11D, enabling the amplifier, 12A to pass the effective total power density of the radiation in both of the pulses 11A, 11B without adverse effect on any pulse 11 or substance in the amplifier 12A.

In the above description of the amplifying section 40A the action of the beam splitters is described for an ideal situation in which the amplifier rods 12A, 12B provide the same gain when amplifying the delayed beams as when amplifying the prompt beams. However, in amplifier rods presently available, such as the neodymium doped glass rods used in this embodiment, the prompt beams partially depopulate the rods and the gain is lower for the delayed beams. Therefore when it is desired to provide substantially equal outputs for the prompt beams and the delayed beams, the beam splitter 14A is adjusted to provide substantially more energy in the delayed beams than in the prompt beams. Typically the beam splitter 14A is adjusted to transmit approximately 20 percent of the energy onto the other beam splitter 17 and to reflect approximately 80 percent to the mirror 16A from which it is reflected to the mirror 16B and from there further reflected to the beam splitter 17. Thus approximately 10 percent of the energy in the pulse 15A proceeds directly through the beam splitters 14A and 17 to the amplifier 12B from which it emerges as the amplified prompt pulse 11D, while approximately 10 percent is reflected from the beam splitter 17 to the reflector 16C from which it is reflected to the amplifier 12A from which it emerges as the amplified prompt pulse 11A. Similarly approximately 40 percent of the energy of the pulse 15A is reflected from the beam splitter 14A, the mirrors 16A and 16B, and the beam splitter 17 to the amplifier 12B from which it emerges as the amplified delayed pulse 11C, while approximately 40 percent of the energy is reflected over the same path to the beam splitter 17 but continues to the mirror 16C and from there to the amplifier 12A from which it emerges as the amplified delayed pulse 11B. The amplification provided by the amplifier rods 12A, 12B is approximately 4 times as great when the prompt beams 11A, 11D are passing through them than when the delayed beams 11B, 11C are passing through, so the output beams are approximately equal in amplitude.

The sections 40B, 40C of the final amplifier stage 10B are identical to the section 40A and function in the same manner.

Apparatus as shown in FIG. 3 may be used instead of, or in addition to, any or all of the bifurcators 13 in the final amplifier stage 10B to provide pulses in the manner about to be described either instead of or in addition to the pulses 11A etc., as in FIG. 1. In FIG. 3 an input pulse 15 is directed to a polarization separator 25 which transmits one component of polarization 11M (say the horizontal component) onto another polarization separator 27, and further to the amplifier 12. The oppositely polarized component 11N (say the vertical component) is reflected toward a mirror 26A where it is further reflected to another mirror 26B and from there to the second polarization separator 27 where it is reflected to the amplifier 12. Thus the polarization separators 25, 27 and the mirrors 26A, 26B arranged as shown in FIG. 3 function as a polarization separating pulse bifurcator 23, providing a function approximately equivalent to that of the bifurcator 13 in FIG. 1. The horizontally polarized pulse 11M is amplified by the amplifier 12 and emerges therefrom toward a polarization separator 24 and is transmitted therethrough as indicated at 11M. The vertically polarized pulse 11N, traveling over the longer path 25, 26A, 26B, 27 arrives at the amplifier 12 just after the first pulse 11M has emerged therefrom. The vertically polarized pulse 11N is amplified by the amplifier 12 and proceeds to the polarization separator 24 where it is reflected as indicated at 11N. Thus the pulses 11M and 11N are separated so that they can be conveniently directed along different paths to the selected location 22. Each pulse 11M, 11N has a power density less than the given power density that the amplifier 12 can tolerate without adverse effect. Since only one pulse 11M or 11N is present in the amplifier 12 at any instant it functions normally although the effective total power density of the pulses 11M and 11N directed through it in rapid succession may exceed the given power density.

For most purposes the delay between one pulse and the next in the region 12 is only as much as is necessary to avoid adversely affecting any pulse or substance in the region 12, allowing a reasonable factor of safety. For some purposes, however, longer delays may be permissible or even preferable. Typically a delayed pulse is adjusted to arrive at the region 12 about 8 to 10 nanoseconds after the arrival of the preceding pulse. (Each pulse typically is about 1 to 5 nanoseconds in duration, but may be as short as about 10 picoseconds.) Where the region 12 comprises an amplifier, as in the embodiments shown in the drawings, the delay of course should be less than the pumping time of the amplifier (typically a few hundred microseconds).

FIG. 2 schematically shows typical path directing means 20 for causing the pulses 11 to arrive at the selected location 22 substantially simultaneously. The output pulse 11B emerging from the amplifier 12A after having traveled over the longest path from the beam splitter 31 through the beam splitter 34, the reflector 37, the amplifier 38, the beam splitter 14A, the reflectors 16A, 16B, the beam splitter 17, and the reflector 16C, is further directed over a relatively short path 21B from the amplifier 12A to the dodecahedral target chamber 22, passing through a window in one of the faces of the chamber 22 and proceeding to a target (not shown) at the center of the dodecahedren 22. The amplified pulse 11L emerging from the amplifier 12F after having traveled over the shortest path from the beam splitter 31 directly through the amplifier 32, and the beam splitters 14C and 17C is further directed over a relatively longer path 21L from the amplifier 12F to the dodecahedral target chamber 22, passing through a window in one of the forces of the chamber 22 and proceeding to the target at the center of the dodecahedren 22. The path 21L from the amplifier 12F to the target chamber 22 is longer than the path 21B from the amplifier 12A to the target chamber 22 by the same distance that the path traveled by the pulse 11L from the beam splitter 31 to the amplifier 12F is shorter than the path traveled by the pulse 11B from the beam splitter 31 to the amplifier 12A, so that the total distance traveled by each pulse from the beam splitter 31 to the target chamber 22 is the same. The other ten paths 21 have intermediate lengths chosen so that the total distance traveled by each pulse 11 from the beam splitter 31 to the target chamber 22 is the same as the distance traveled by every other pulse 11. The paths 21 are determined approximately by routine computation, and reflectors 29 are placed in the appropriate locations to provide the selected paths 21. Small adjustments are then made in the locations and angles of the reflectors 29 to make all of the total path lengths as nearly equal as possible and thus to cause each pulse 11 to arrive substantially simultaneously with the other pulses 11 at the target in the center of the chamber 22.

For some purposes it is desirable to provide at the target a pulse having a specific effective shape. In such cases the path lengths are adjusted so that rather than having the beams arrive simultaneously, one or more of the beams may be delayed by predetermined amounts to provide an arbitrary time and intensity profile of the resulting pulse. After passing through the amplifiers 12, the various pulses 11 are adjusted to arrive at the target at different times at the same spot. For example one beam may arrive first at the target, two more may arrive simultaneously but slightly after the first beam, and so on, to build up a smooth envelope of superimposed pulses, and thus to provide a tailored pulse shape at the target. For convenience, the beam splitters 14A, 14B, 14C may also be adjusted to control the relative intensities of the various prompt and delayed beams 11 to aid in providing a specific pulse shape at the target.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method of directing radiation pulses to a region wherein either a pulse or a substance in the region is adversely affected by the presence of more than a given power density therein, comprising providing in rapid succession a plurality of pulses each having a power density of not more than the given power density, controlling the path of each pulse in such manner as to cause each pulse to arrive at the region at an angle differing by at least its divergence angle from the arrival angle of every other such pulse, and controlling the path length of each pulse in such manner as to cause it to arrive at the region at a time enough later than the arrival time of the preceding pulse that the total power density in the region at any instant is not more than the given power density, so that the effective total power density of the radiation directed through the region may exceed the given power density without adversely affecting any pulse or substance in the region.

2. A method as in claim 1, wherein a radiation pulse is split into a plurality of portions and each portion is directed along a path of different length to provide the succession of pulses to the region.

3. A method as in claim 1, wherein each pulse directed to the region emerges at an angle differing by at least its divergence angle from the emergence angle of every other such pulse, and each emerging pulse is directed along a different path to a selected location.

4. A method as in claim 3, wherein the path length of each emerging pulse is chosen so as to cause it to arrive at the selected location substantially simultaneously with the other pulses.

5. A method as in claim 3, wherein the path length of each emerging pulse is chosen so as to cause it to arrive at the selected location at such time relative to the other pulses as to provide a predetermined effective combined pulse shape at the location.

6. In an apparatus for directing radiation pulses to a region wherein either a pulse or a substance in the region is adversely affected by the presence of more than a given power density therein, the improvement comprising means for providing in rapid succession a plurality of pulses each having a power density of not more than the given power density, means for controlling the path of each pulse in such manner as to cause each pulse to arrive at the region at an angle differing by at least its divergence angle from the arrival angle of every other such pulse, and means for controlling the path length of each pulse in such manner as to cause it to arrive at the region at a time enough later than the arrival time of the preceding pulse that the total power density in the region at any instant is not more than the given power density, so that the effective total power density of the radiation directed through the region may exceed the given power density without adversely affecting any pulse or substance in the region.

7. Apparatus as in claim 6, wherein the pulse providing means comprises means for splitting a radiation pulse into a plurality of portions and means for directing each portion along a path of different length to the region.

8. Apparatus as in claim 6, wherein the region comprises means for amplifying the pulses directed thereto.

9. Apparatus as in claim 6, including means for controlling the path of each pulse in such manner as to cause each pulse directed to the region to emerge at an angle differing by at least its divergence angle from the emergence angle of every other such pulse, and means for directing each emerging pulse along a different path to a selected location.

10. Apparatus as in claim 9, wherein the path directing means are arranged to direct each pulse along a path of such length as to cause the pulse to arrive at the selected location substantially simultaneously with the other pulses.

11. Apparatus as in claim 9, wherein the path directing means are arranged to direct each pulse along a path of such length as to cause it to arrive at the selected location at such time relative to the other pulses as to provide a predetermined effective combined pulse shape at the location.

12. Apparatus as in claim 6, comprising also at least one additional such region arranged to receive pulses from the pulse providing means.

13. Apparatus as in claim 12, wherein the pulse providing means comprises means for splitting a radiation pulse into a plurality of portions and means for directing a smaller plurality of portions, each along a path of different length, to each region.

14. Apparatus as in claim 12, wherein each region comprises means for amplifying the pulses directed thereto.

15. Apparatus as in claim 12, including means for controlling the path of each pulse in such manner as to cause each pulse directed to each region to emerge at an angle differing by at least its divergence angle from the emergence angle of every other such pulse in the same region, and means for directing each emerging pulse along a different path to a selected location.

16. Apparatus as in claim 15, wherein the path directing means are arranged to direct each pulse along a path of such length as to cause the pulse to arrive at the selected location substantially simultaneously with the other pulses.

17. Apparatus as in claim 15, wherein the path directing means are arranged to direct each pulse along a path of such length as to cause it to arrive at the selected location at such time relative to the other pulses as to provide a predetermined effective combined pulse shape at the location.

* * * * *